United States Patent
Yan et al.

(10) Patent No.: US 9,058,166 B2
(45) Date of Patent: Jun. 16, 2015

(54) METHOD AND APPARATUS FOR MANAGING PROCESSING RESOURCES IN A DISTRIBUTED PROCESSING SYSTEM

(75) Inventors: Desmond Yan, Vancouver (CA); Thomas Ng, Richmond (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 619 days.

(21) Appl. No.: 13/412,521

(22) Filed: Mar. 5, 2012

(65) Prior Publication Data
US 2013/0232504 A1 Sep. 5, 2013

(51) Int. Cl.
G06F 9/46 (2006.01)
G06F 1/32 (2006.01)
G06F 9/50 (2006.01)

(52) U.S. Cl.
CPC ............ G06F 1/3206 (2013.01); G06F 1/3287 (2013.01); G06F 9/5094 (2013.01); Y02B 60/1282 (2013.01); Y02B 60/142 (2013.01); Y02B 60/32 (2013.01)

(58) Field of Classification Search
CPC .... G06F 1/3206; G06F 1/3287; G06F 9/5094
See application file for complete search history.

(56) References Cited

U.S. PATENT DOCUMENTS

| | | | |
|---|---|---|---|
| 6,711,691 B1 | 3/2004 | Howard et al. | |
| 6,912,493 B1 * | 6/2005 | Scheel et al. | 703/2 |
| 7,249,179 B1 * | 7/2007 | Romero et al. | 709/226 |
| 8,254,249 B2 | 8/2012 | Wen et al. | |
| 8,793,529 B2 * | 7/2014 | Lee | 714/4.12 |
| 2007/0276933 A1 * | 11/2007 | Lee et al. | 709/223 |
| 2008/0189468 A1 * | 8/2008 | Schmidt et al. | 711/6 |
| 2010/0115327 A1 * | 5/2010 | Lee | 714/4 |
| 2010/0185766 A1 * | 7/2010 | Sano et al. | 709/226 |
| 2011/0032814 A1 * | 2/2011 | Wen et al. | 370/217 |

FOREIGN PATENT DOCUMENTS

EP 1770509 A2 4/2007

OTHER PUBLICATIONS

The Extended European Search Report dated May 31, 2013 for the European Patent Application No. 13156299.3, pp. 1-7.

* cited by examiner

*Primary Examiner* — Meng An
*Assistant Examiner* — James J Lee

(57) ABSTRACT

In one aspect, the present invention reduces average power consumption in a distributed processing system by concentrating an overall processing load to the minimum number of processing units required to maintain a defined level of processing redundancy. When the required number of active processing units is fewer than all available processing units, the inactive processing units may be held in a reduced-power condition. The present invention thereby maintains the defined level of processing redundancy for reallocating jobs responsive to the failure of one of the active processing units, while reducing power consumption and simplifying jobs allocation and re-allocation when expanding or shrinking the active set of processing units responsive to changing processing load. As a non-limiting example, the distributed processing system is implemented within a telecommunications network router or other apparatus having a configured set of processing cards, such as control-plane processing cards.

24 Claims, 10 Drawing Sheets

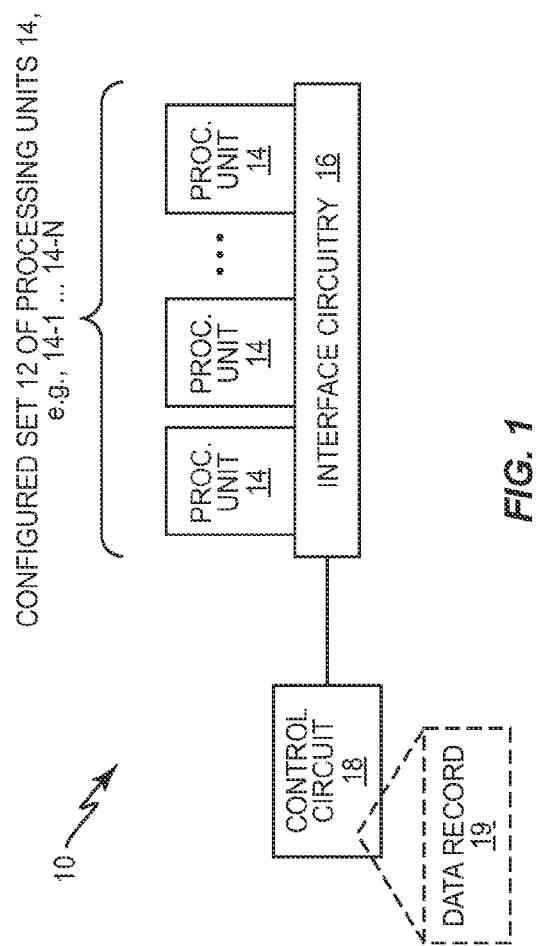
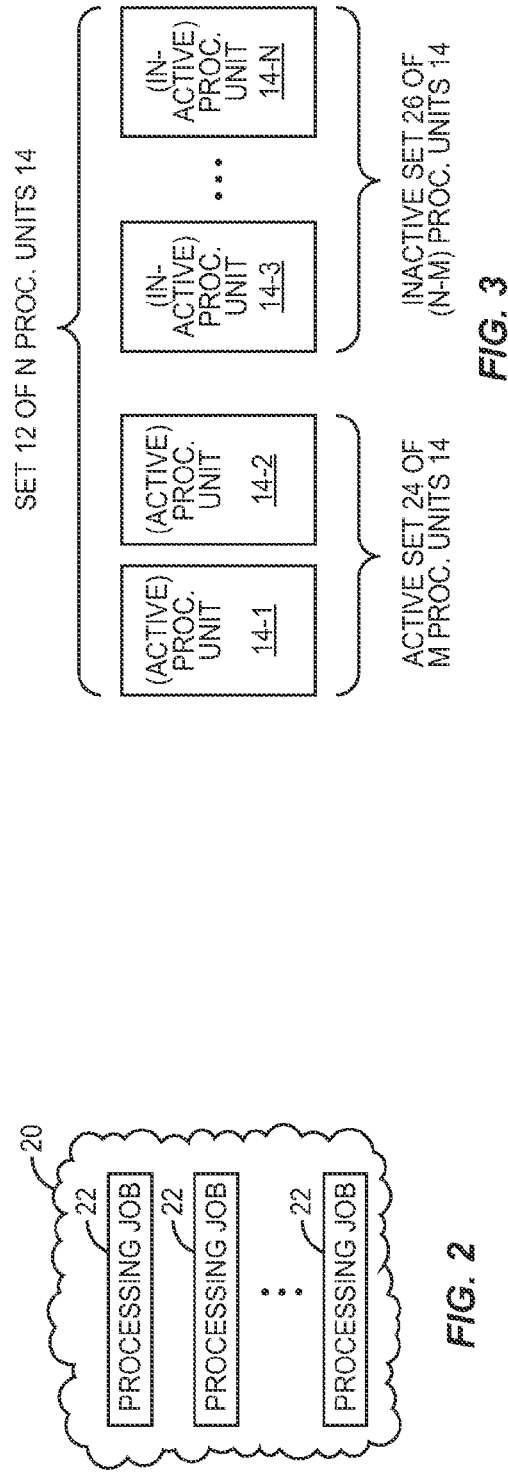

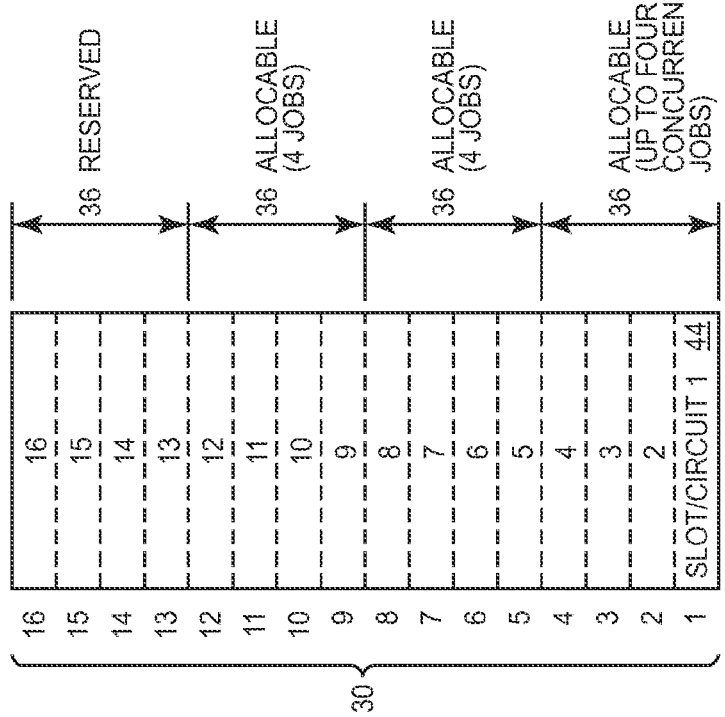

METHOD AND APPARATUS FOR MANAGING PROCESSING RESOURCES IN A DISTRIBUTED PROCESSING SYSTEM

TECHNICAL FIELD

The present invention generally relates to distributed processing systems, and particularly relates to managing processing resources in a distributed processing system.

BACKGROUND

Distributed processing systems typically offer a pool of processing resources that are allocable to processing jobs, which may be defined as a defined digital processing task or as a set of associated digital processing tasks. As a non-limiting example, telecommunication systems often treat each subscriber's connection as a job, or as related set of jobs, such as call control processing, communication signal processing, etc. Consequently, telecommunications equipment often includes multiple sets of processing cards. Each set may be of a different type or may otherwise be tailored to perform certain specific job types associated with supporting the connections of potentially many subscribers.

As a working example, a mobile network node for use in a wireless communication network includes a number of "Service Cards" or SCs that provide control plane processing for mobile subscribers. In a known implementation, the node uses a Distributed Control Processing (DCP) scheme to process the potentially heavy signalling load generated from many, concurrently active subscribers. For example, the maximum number of subscribers supported by the node is proportional to the number of SCs configured in it. Such nodes often adopt a chassis-based architecture that allows for the installation of a greater or fewer number of processing cards, to tailor the processing capacity as desired.

Load balancing may be used with such arrangements of processing cards, wherein the node distributes the overall processing load associated with the currently active subscribers across all of the installed cards. Known load-balancing schemes include round-robin and random hashing techniques. With the former technique, the allocation of processing jobs follows a round-robin scheme wherein successive new jobs or batches of jobs are allocated to successive ones of the installed cards, going from the first card to the last and then looping back around. In the latter technique, new jobs are distributed uniformly across the installed set of cards, using a random hashing technique.

Both approaches result in a general distribution of currently-active processing jobs across all installed cards, and such systems generally provide for the re-allocation of processing jobs from a failed card to one or more of the remaining cards. The re-allocation process may work at varying levels of granularity, meaning that some approaches to re-allocating jobs from a failed card work at the jobs level, while other approaches re-allocate batches or groups of jobs.

Regardless, conventional load balancing and distribution approaches have a number of disadvantages. For example, allocations have to be rebalanced when new cards are added. If random hashing is used for load balancing, redistribution becomes non-deterministic. Further, such approaches generally use all installed cards, meaning that overall power consumption is not well-proportioned with respect to overall processing load.

SUMMARY

In one aspect, the present invention reduces average power consumption in a distributed processing system by concentrating an overall processing load to the minimum number of processing units required to maintain a defined level of processing redundancy. When the required number of active processing units is fewer than all available processing units, the inactive processing units may be held in a reduced-power condition. The present invention thereby maintains the defined level of processing redundancy for reallocating jobs responsive to the failure of one of the active processing units, simultaneously reducing power consumption and simplifying jobs allocation and re-allocation when expanding or shrinking the active set of processing units responsive to changing processing load.

In one embodiment the present invention comprises a method of concentrating a processing load comprising individually allocable processing jobs to the minimum number of processing units in a configured set of processing units needed to maintain a defined level of processing redundancy for the processing jobs. As a non-limiting example, the method is implemented in a telecommunications network router or other apparatus that includes a distributed processing system that allocates processing jobs to a configured set of processing cards as the processing units in question. The processing cards are, for example, control-plane processing cards that provide control-plane signal processing.

The method includes initially activating fewer than all of the configured set of processing units, thereby logically forming an active set of two or more (active) processing units to which new processing jobs are allocable, and a remaining, inactive set of one or more (inactive) processing units to which new processing jobs are not allocable. One embodiment initially activates a minimum of two processing units. The method further includes reserving in each active processing unit a reserved jobs capacity equal to a total jobs capacity of one processing unit, which is assumed to be the same for all processing units in the configured set, divided by the number M of active processing units, thereby leaving in each active processing unit a remaining allocable jobs capacity and preserving, as the defined level of processing redundancy, an aggregate reserved jobs capacity across the active processing units that is equal to the total jobs capacity of one processing unit.

Thus, the jobs capacity held in reserve in each active processing unit increases or decreases as the number M of active processing units is increased or decreased, as needed, in response to changes in the overall processing load. Correspondingly, the method includes allocating new processing jobs to respective ones of the active processing units until more jobs capacity is needed to preserve the defined level of processing redundancy. When more jobs capacity is needed, one or more of the inactive processing units are activated to increase M, and correspondingly, the reserved jobs capacity that is reserved in each active processing unit is re-computed to reflect the increase in M. That is, for M active processing units, the jobs capacity reserved in each processing unit is the total jobs capacity of one processing unit divided by M, so that there is, for any value of M, enough capacity reserved in the aggregate across all M active processing units to redistribute the processing jobs allocated to any one of the M processing units, in case that processing unit fails.

In another embodiment, a processing apparatus includes a configured set of processing units or interface circuitry for interfacing with the configured set of processing units, and a control circuit that is configured to concentrate a processing load comprising individually allocable processing jobs to the minimum number of the processing units needed to maintain a defined level of processing redundancy for the processing jobs. To accomplish these operations, the control circuit is configured to initially activate fewer than all of the configured set of processing units, thereby logically forming an active set of two or more (active) processing units to which new processing jobs are allocable, and a remaining, inactive set of one or more (inactive) processing units to which new processing jobs are not allocable.

The control circuit reserves in each active processing unit have a reserved jobs capacity equal to a total jobs capacity of one processing unit divided by the number M of active processing units. Each processing unit is assumed to have the same total jobs capacity, and this operation thereby leaves in each active processing unit a remaining allocable jobs capacity that preserves, as the defined level of processing redundancy, an aggregate reserved jobs capacity across the active processing units that is equal to the total jobs capacity of one processing unit.

The control circuit is further configured to allocate new processing jobs to respective ones of the active processing units until more jobs capacity is needed to preserve the defined level of processing redundancy, and then activate one or more of the inactive processing units to increase M. When it increases M, the control circuit correspondingly re-computes the reserved jobs capacity that is reserved in each active processing unit to reflect the increase in M.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of a processing apparatus configured to perform processing load allocation as taught herein.

FIG. 2 is a diagram of an example processing load comprising a dynamically changing number of individual processing tasks, referred to as "processing jobs."

FIG. 3 is a diagram of one embodiment of a configured set of processing units, including a first subset referred to as an active set containing currently "active" processing units and corresponding, remaining subset referred to as an inactive set containing currently inactive processing units.

FIG. 6 is a diagram illustrating one embodiment of logical indexing for a configured set of processing units, such as used for preferential, ordered activation and inactivation of processing units, as the sizes of the active and inactive sets of processing units are dynamically changed responsive to changes in an overall processing load.

FIG. 7 is a diagram illustrating the size of individual capacity quotas, expressed in terms of the number of job slots or circuits included within each capacity quota, where each such slot or circuit supports one allocated processing job.

DETAILED DESCRIPTION

Figure 5:
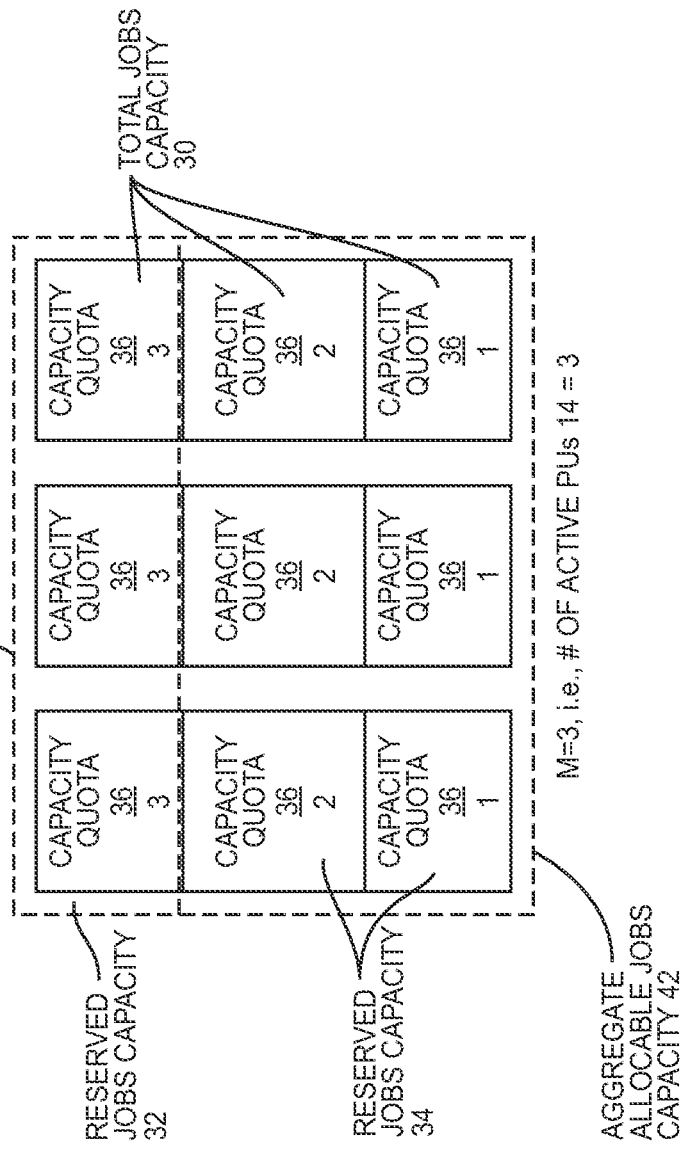
FIG. 5 is a diagram of one embodiment of capacity quotas formed as logical subdivisions on a set of active processing units, wherein the unit (subdivision) size of the capacity quotas is dynamically recalculated in dependence on the number of processing units currently in the active set.

FIG. 1 illustrates an embodiment of a processing apparatus 10 ("apparatus 10") that includes a configured set 12 of processing units 14 or interface circuitry 16 for interfacing with a configured set 12 of processing units 14. As will be explained, the processing apparatus 10 may be understood as including or otherwise functioning as a distributed processing system and the apparatus 10 correspondingly implements a method of managing processing resources in that distributed processing system.

Of course, those of ordinary skill in the art will appreciate that the functional and/or physical architecture depicted in FIG. 1 serves as a simplified example for clarity of discussion, and is not limiting with respect to the method at issue. Indeed, the method of managing distributed processing resources taught herein has broad applicability. For example, the method provides significant advantages when implemented in wireless communication network nodes, such as routers, etc.

With reference now to both FIGS. 1 and 2, the apparatus 10 includes a control circuit 18 that is configured to concentrate a processing load 20 that comprises individually allocable processing jobs 22 to the minimum number of the processing units 14 needed to maintain a defined level of processing redundancy for the processing jobs 22. Here, the "processing load 20" should be understood as a dynamically changing value. For example, in a telecommunications node, subscriber connections are established and terminated on an ongoing basis, with each connection, or a particular set of processing tasks to support each such connection, regarded as one processing job 22.

The processing load 20 therefore may be understood as an overall set of currently active processing jobs 22, with new processing jobs 22 being added as needed, and with various ones of the currently-active processing jobs 22 being completed or otherwise terminated at any given time. Moreover, in a broad sense, the term "processing job 22" should be understood as a defined processing task or set of associated tasks that can be dispatched, assigned, or otherwise allocated to selected processing resources.

With further reference to FIG. 3, the control circuit 18 achieves the desired concentration of processing jobs 22 based on being configured to initially activate fewer than all of the configured set 12 of processing units 14, thereby logically forming an active set 24 of two or more processing units 14 to which new processing jobs 22 are allocable, and a remaining, inactive set 26 of one or more processing units 14 to which new processing jobs 22 are not allocable. "Initially" activating fewer than all processing units 14 comprises, for example, performing a power-on procedure, a reset procedure, or simply an initialization procedure for beginning operations, wherein the control circuit 18 considers fewer than all of the installed or available processing units 14 as "active" for use in allocating processing jobs 22.

For ease of discussion, assume there is an integer number N of processing units 14 in the configured set 12, which may all processing units of a given type that are detected as installed and available within the apparatus 10. (Here, it should be understood that there may be multiple types of processing units in the apparatus 10 and these teachings may be applied to each such type, or applied jointly across related types of resources.) With N processing units 14 in the configured set 12, the control circuit 18 initially activates M of N processing units 14, where M is an integer number that at least initially is less than N. Of course, the control circuit 18 changes the value of M over time, responsive to changes in the processing load 20, and one of the advantages of the present invention is a simplified process for allocating and re-allocating processing jobs 22 among the active processing units 14. As a general proposition, therefore, the initial value of M is less than N, but M can increase to N when the full processing capacity of the configured set 12 of processing units 14 is needed. Conversely, M can decrease over time, as less processing capacity is needed for the current value of the processing load 20.

At any given time, those processing units 14 currently in the active set 24 are referred to as "active" processing units 14 and those processing units 14 currently in the inactive set 26 are referred to as "inactive" processing units 14. In one sense, these labels denote the logical, rather than literal or physical, state of given individual processing units 14. That is, "active" denotes a processing unit 14 to which the allocation of processing jobs 22 is permitted, and "inactive" denotes a processing unit 14 to which the allocation of processing jobs 22 is not permitted. Of course, the control circuit 18 dynamically updates the active/inactive states of individual processing units 14, as needed. In this regard, it may be that an inactive processing unit 14 is actually performing one or more functions, but is not being used to support the processing load 20. Similarly, especially when first added to the active set 24, an active processing unit 14 may not have any processing jobs 22 allocated to it, but it is available for such allocations.

Figure 4:
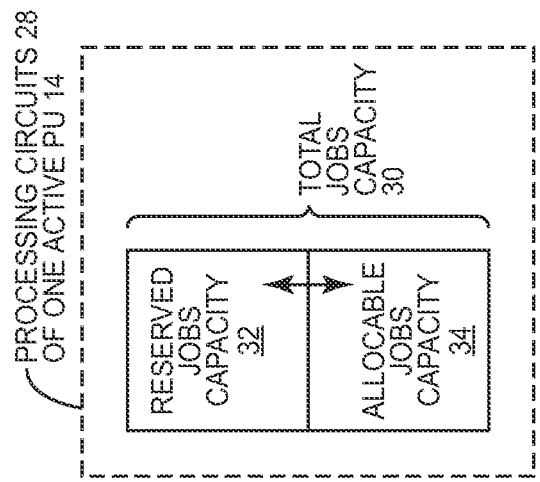
FIG. 4 is a diagram of one embodiment of processing circuits 28 representing the overall processing resources of one processing unit, wherein those overall processing resources represent a total jobs capacity, which according to the teachings herein is logically divided into a reserved jobs capacity and a corresponding, remaining allocable jobs capacity.

As for the active processing units 14 in the active set 24, and with reference to FIG. 4, each processing unit 14 (PU in the illustration) comprises a number of processing circuits 28 that represent a "total jobs capacity" 30 of the processing unit 14. The total jobs capacity 30 may be measured or otherwise expressed in terms of the maximum number of concurrent processing jobs 22 that can be supported by the processing circuits 28. According to the teachings herein, the total jobs capacity 30 of each active processing unit is divided into two parts, including a reserved jobs capacity 32 and an allocable jobs capacity 34. The division is not necessarily equal and it changes dynamically, as explained below. The reserved jobs capacity 32 is, as the name implies, held in reserve on each active processing unit 14 in the active set 24, for use as needed in re-allocating jobs in response to one of the active processing units 14 failing in a manner that makes it unavailable for use in supporting the processing load 20. Conversely, the allocable jobs capacity 34 on any given active processing unit 14 in the active set 24 is available for use in supporting the processing jobs 22 allocated to that given active processing unit 14.

With the finite "size" of the total jobs capacity 30, increasing the size of the reserved jobs capacity 32 correspondingly reduces the size of the allocable jobs capacity 34. The division between reserved and allocable jobs capacities 32 and 34 is dynamically managed using a further unit of division, referred to herein as the "capacity quota" 36, shown by way of example in FIG. 5.

In more detail, the overall, total jobs capacity 30 of each active processing unit is divided into an integer number of nominally equal-sized capacity quotas 36. The number of capacity quotas 36 that each active processing unit 14 is divided into is the same as the number M of active processing units 14 in the active set 24. FIG. 5 shows the example case where M=3, yielding three capacity quotas 36 on each active processing unit 14. In particular, one capacity quota 36 on each active processing unit 14 operates as the reserved jobs capacity 32 and two capacity quotas 36 together operate as the allocable jobs capacity 34. Further, the aggregate reserved jobs capacity 40 across the M active processing units 14 is M capacity quotas 36, which can be seen as equaling the total jobs capacity 30 of one processing unit 14. Similarly, the aggregate allocable jobs capacity 42 across the M active processing units is (M−1)×M capacity quotas 36.

To understand these divisions, consider that the control circuit 18 is configured to reserve in each active processing unit 14 a reserved jobs capacity 32 that is equal to the total jobs capacity 30 of one processing unit 14 divided by the number M of active processing units 14. One may assume that the total jobs capacity 30 is equal for all processing units 14 in the configured set 12. This logical division leaves in each active processing unit 14 a remaining allocable jobs capacity 34 and preserves, as a defined level of processing redundancy, an aggregate reserved jobs capacity 40 across the active processing units 14 that is equal to the total jobs capacity 30 of one processing unit 14. For example, if M=2, each active processing unit 14 is divided into two equal capacity quotas 36, one representing the allocable jobs capacity 34 for that active processing unit 14 and the other representing the reserved jobs capacity 32 for that active processing unit 14.

In that manner, for the M=2 case, each active processing unit 14 has half of its total jobs capacity 34 available for normal allocation usage, and the other half of its total jobs capacity 34 reserved in case the other active processing unit 14 fails. For the M=3 example of FIG. 5 as described above, one sees that the reserved jobs capacity 32 of each active processing unit 14 equals one-third (1/M where M=3) of the total jobs capacity 30. As a further example, if the active set 24 include five active processing units 14, M=5, the total jobs capacity 30 of each active processing unit 14 is divided by five, yielding five capacity quotas 36, with one capacity quota 36 reserved for taking one-fifth of the processing jobs 22 that must be re-allocated in response to a failure of one active processing unit, and four capacity quotas 36 available as the allocable jobs capacity 34.

With these examples in mind, the control circuit 18 is configured to allocate new processing jobs 22 to respective ones of the active processing units 14 until more jobs capacity is needed to preserve the defined level of processing redundancy, and then activate one or more of the inactive processing units 14 to increase M, correspondingly re-computing the reserved jobs capacity 32 that is reserved in each active processing unit 14 to reflect the increase in M. Thus, where the defined level of processing redundancy desired for the active set 24 is the total jobs capacity 30 of one processing unit 14, there is sufficient processing capacity to re-allocate all processing jobs 22 from a given active processing unit 14 in the active set 24 to remaining ones in the active set 24 in case of failure of that given active processing unit 14.

In at least one embodiment, the control circuit 18 is configured to detect whether any one of the active processing units 14 is idle, wherein it has no processing jobs 22 allocated to it, and correspondingly deactivate the idle processing unit 14. This inactivation procedure logically "moves" the idle processing unit 14 from the active set 24 to the inactive set 26, and thus decreases M. As such, the control circuit 18 is further configured to correspondingly re-compute the reserved jobs capacity 32 that is reserved in each active processing unit 14 to reflect the decrease in M. Further, in at least one such embodiment, the control circuit 18 is configured to condition the decision to move an idle processing unit 14 from the active set 24 to the inactive set 26 on the basis of at least one of: the idle processing unit 14 being idle for a defined minimum idle time, or an activity measure representing a rate at which new processing jobs 22 are arising.

Such conditioning imposes a form of hysteresis that prevents rapidly changing active and inactive set memberships. Of course, one or more other forms of hysteresis can be used in addition to these examples, or as an alternative. For example, the control circuit 18 may increase M as needed to keep up within an increasing processing load 20, but not permit M to decrease until a defined minimum time has passed since the last increase, and even then the control circuit 18 may also monitor the processing load trend and disallow decreases in M if the processing load 20 has more than a defined variance over a monitored time interval, or continues increasing, or is otherwise not stabilized.

In a further extension or variation, the control circuit 18 is configured to, at least for the initial activation of processing units 14, activate processing units 14 according to an activation preference scheme in which a more preferred one of the processing units 14 is activated before a less preferred one of the processing units 14. For example, as shown in FIG. 6, the configured set 12 of processing units 14 may be indexed from a starting index value, e.g., "1", to an ending index value, e.g., "N". Merely as an example, FIG. 6 depicts N=7. One sees that four processing units 14 are initially activated in indexed order, from 1 to 4. This action leaves an inactive set 26 of three processing units 14, indexed from 5 to 7. The indexing may be dynamically determined or preconfigured, e.g., via provisioning data stored in the apparatus 10.

As an example of how this optional index-based approach to preferential activation of processing units 14, consider the example case where at least some of the processing units 14 in the configured set 12 of processing units 14 have differing processing efficiencies. In this example case, the control circuit 18 is configured to, at least for the initial activation, preferentially activate the more efficient processing units 14. Such circumstances may be common, or at least not rare, in the telecommunications context, wherein one or more of the processing units 14 in the configured set 12 are of a newer design than one or more of the other processing units 14. While it may be assumed that these newly designed processing units 14 each offer the same total jobs capacity 30 as the older ones, they may be dramatically more efficient, or otherwise improved, and therefore preferred for use when less than all of the processing units 14 in the configured set 12 are needed to support the processing load 20.

Further, in the context of indexed processing units 14, in at least one embodiment, at least the processing units 14 in the configured set 12 are logically indexed. Correspondingly, the control circuit 18 is configured to preferentially allocate new processing jobs 22 as they arise to lower-index ones of the active processing units 14, so that higher-index ones of the active processing units 14 are more likely to become idle. The control circuit 18 is further configured to detect that any one of the active processing units 14 has become idle and, based at least in part on detecting the idle processing unit 14, move the idle processing unit 14 from the active set 24 to the inactive set 26. This action decreases M, and the control circuit 18 is further configured to correspondingly re-compute the reserved jobs capacity 32 that is reserved in each active processing unit 14 to reflect the decrease in M.

Whether indexing is used or not, however, the control circuit 18 in at least one embodiment is configured to maintain the inactive processing units 14 in a reduced-power condition. Depending on the design of the apparatus 10, the reduced-power condition may be an "off" state, e.g., where some or all of the power connections or buses to the inactive processing units 14 are gated off. Alternatively, the reduced-power condition may be a "standby" state where some power is consumed, but where that power is generally appreciably less than if the processing unit 14 was activated for jobs allocation. Further, the reduced-power condition may be different for some of the inactive processing units 14. For example, there may be a power-on or boot-up process associated with powering up a processing unit 14, and the time lag of that process may be undesirably long. In such cases, the control circuit 18 may keep at least one of the inactive processing units 14 in a "warm" state, meaning that it is ready to be quickly moved from the inactive set 26 to the active set 24. The remaining inactive processing units 14, if any, may be powered-down, or placed into a "hibernation" or other very low power state.

With momentary reference back to FIG. 1, one sees that the control circuit 18 in one or more embodiments maintains a data record 19 that reflects the "mapping" between the currently allocated processing jobs 22 and their respective capacity quotas 36. For example, the data record 19 includes information for each active processing job 22 that indicates the respective active processing unit 14 to which that processing job 22 is allocated, and the respective capacity quota 36 on that processing unit 14 that has that processing job 22.

To better appreciate the value of this optional mapping, and how it simplifies jobs allocation re-allocation processing, reconsider the earlier example where the control circuit 18 is configured to: logically divide the total jobs capacity 30 of each active processing unit 14 into M capacity quotas 36, wherein each capacity quota 36 supports an equal integer number of concurrent processing jobs 22; and to reserve one capacity quota 36 on each active processing unit 14 as said reserved jobs capacity 32 for that active processing unit 14, while treating the remaining one or more capacity quotas 36 on each active processing unit 14 as said allocable jobs capacity 34 for that active processing unit 14. In such a context, in at least one embodiment the control circuit 18 is configured to allocate new processing jobs 22 to respective ones of the active processing units 14 based on being configured to map each new processing job 22 to a selected one of the capacity quotas 36 on a selected one of the active processing units 14, and to maintain a data record 19 reflecting the one-to-one mapping between each currently-active processing job 22 and the respective capacity quota (36) to which that processing job 22 is assigned.

In at least one such embodiment, the control circuit 18 is configured to resize the capacity quotas 36 dynamically as the number M of active processing units 14 is increased or decreased in response to changes in the processing load 20, and correspondingly update the data record 19 to reflect any changes in the one-to-one mapping of processing jobs 22 to capacity quotas 36 that arise from the resizing of the capacity quotas 36. Here, the need for "re-mapping" one or more of the processing jobs 22 on any given active processing unit 14 arises because the boundaries between adjacent capacity quotas 36 changes as the unit size of the capacity quotas 36 changes.

Further in the same or another embodiment, the control circuit 18 is configured to fill the capacity quotas 36 that are within the allocable jobs capacity 34 on any one of the active processing units 14 according to a quota filling scheme that attempts to fully utilize each given capacity quota 36 before allocating any processing jobs 22 to a next one of the capacity quotas 36. This tends to fill the lower capacity quotas 36 first, meaning that the processing jobs 22 currently allocated to a given one of the active processing units 14 tend to be "concentrated" in the smallest number of capacity quotas 36 needed to support them. In turn, this simplifies the mapping process by minimizing the number of processing jobs 22 whose capacity quota affiliations change when the capacity quotas 36 are resized to reflect increases or decreases in M.

Now turning to FIG. 7, one sees an example implementation having particular relevance in the telecommunications context. Here, one assumes that M=4, and that each processing unit 14 has sixteen allocable "slots" or "circuits" 44, meaning that each such processing unit 14 supports, at most, sixteen simultaneous processing jobs 22. A slot or circuit 44 may comprise a discrete processor or processing circuit, but more generally should be understood as comprising a particular collection or portion of the processing resources 28 of one processing unit 14 that supports one processing job 22 at a time.

As so, a processing unit 14 with sixteen slots or circuits 44 can support, at most, sixteen concurrent processing jobs 22. With this accounting nomenclature, the total jobs capacity 30 of one processing unit 14 in this example is sixteen processing jobs 22, and the reserved jobs capacity 32 on each active processing unit 14 is equal to the jobs capacity of one capacity quota 36, i.e., four processing jobs 22, with each processing job 22 being allocated to one of the four slots or circuits 44. Similarly, the allocable jobs capacity 34 of each active processing unit 14 equals the jobs capacity of the three remaining capacity quotas 36, which in this example case is four slots or circuits 44 per capacity quota 36 multiplied by three capacity quotas 36, equaling twelve slots or circuits 44 available for a maximum of twelve concurrent processing jobs 22.

Of course, in practice, each processing unit 14 may support many more simultaneous jobs 22. More generically, the total jobs capacity 30 can be expressed as "R" slots or circuits 44 (hereinafter referred to as "slots 44" for simplicity, with one processing job 22 allocable to one slot 44 at a time). Correspondingly, the jobs capacity of each capacity quota 36 is R/M processing jobs 22.

For further clarification: let "TJC" represent the total jobs capacity 30 of one processing unit 14; "RJC" represent the reserved jobs capacity 32 of one active processing unit 14; "AJC" represent the allocable jobs capacity 34 of one active processing unit 14; "ARJC" represent the aggregate reserved jobs capacity 40 across an active set 24 of M active processing units 14; and "AAJC" represent the aggregate allocable jobs capacity 42 across that same active set 24. Expressing all such values in terms of their sizes in the maximum count of concurrently allocable processing jobs 22 ("jobs"), one attains the following relationships:

$$TJC = R \text{ jobs},$$

$$CQ = \frac{R}{M} \text{ jobs},$$

$$RJC = \frac{R}{M} \text{ jobs} = CQ \text{ jobs},$$

$$AJC = \frac{(M-1)}{M} R \text{ jobs} = (M-1)CQ \text{ jobs, and}$$

$$ARJC = M \frac{R}{M} \text{ jobs} = R \text{ jobs} = TJC \text{ jobs},$$

$$AAJC = M \frac{(M-1)}{M} R \text{ jobs} = M \cdot AJC \text{ jobs, and}$$

$$\Delta CQ = CQ_M - CQ_{M+1} = \frac{R}{M} - \frac{R}{M+1} = \frac{AJC}{M(M+1)}.$$

The last equation expresses the change in capacity quota size when M is increased by one.

Additionally, with M active processing units 14 in the active set 24, and each such processing unit 14 having its processing resources 28 divided into M capacity quotas 36, one can identify a specific capacity quota 36 on a specific active processing unit 14 using "i" to index active processing units 14 in the active set 24 and "j" to index the capacity quotas 36 on any one of the active processing units 14. See FIG. 8 for an example of this indexing.

Figure 8:
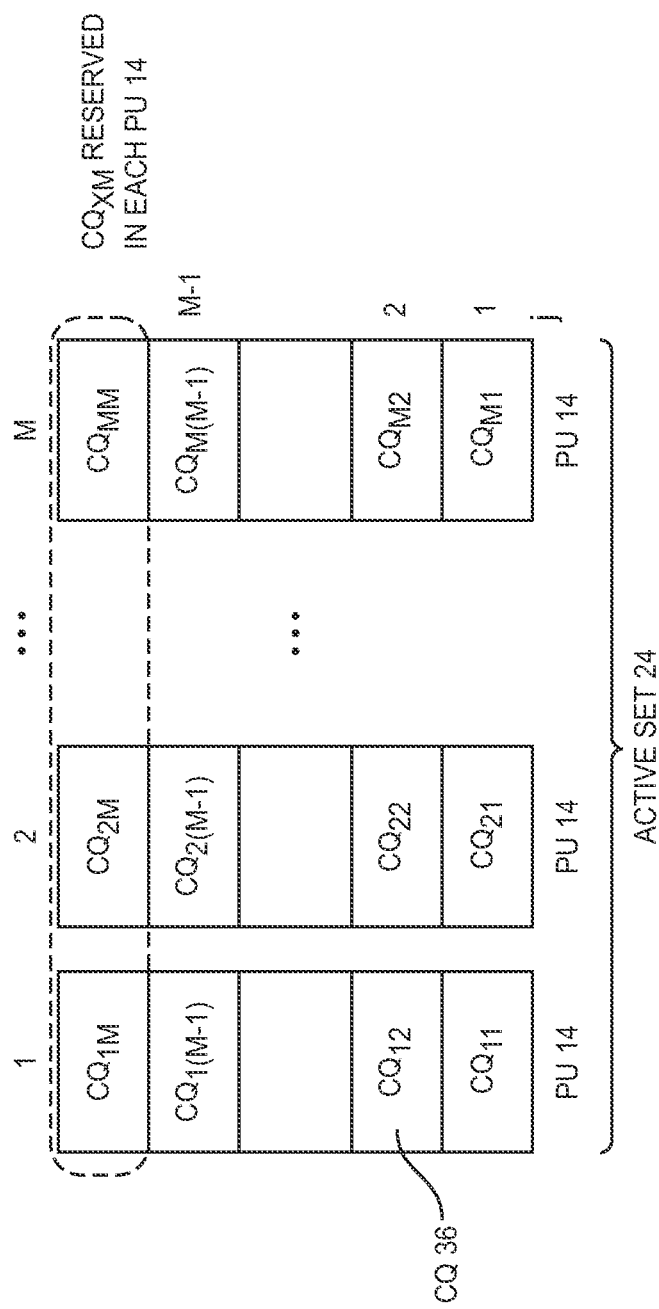
FIG. 8 is a diagram of an active set of processing units and illustrates one embodiment of indexing for identifying and selecting particular capacity quotas on particular processing units in an active set of processing units.

As seen in FIG. 8, for the M-th capacity quota 36 on each active processing unit 14 reserved as the reserved jobs capacity 32, M−1 capacity quotas 36 remain on each active processing unit 14 for use as the allocable jobs capacity 34. For normal allocation of processing jobs 22, any given processing job 22 is allocated to a particular capacity quota 36 on a particular one of the active processing units 14.

This "destination" capacity quota 36 can be identified as $CQ_{ij}$, where i=1, 2, ... M, and j=1, 2, ..., M−1. By limiting the capacity quota indexing to a maximum index value of M−1 during normal jobs allocation processing, the M-th capacity quota 36 on each active processing unit 14 remains reserved for use in redistributing processing jobs 22 from a failed one of the active processing units 14. When a newly arising processing job 22 is to be allocated, one algorithm contemplated herein for selecting the destination index, $Dest\_Quota\_index_{ij}$, is expressed as

```
Dest_Quota_index_ij =
    for (i=1; i<=M; i++)
        for (j=1; j<=(M-1); j++)
            if (Vacancy_Quota_ij > 0)
            {
                Dest_Quota_index = [i,j];
                Vacancy_Quota_ij -=1;
                PL+= 1;
            }
```

It will be understood that the above algorithm generates the "i" and "j" values used to select the processing unit 14 and the capacity quota 36 on that processing unit 14 to which the processing job 22 will be allocated. Further, in the above pseudo code, "PL" denotes the size or count of the overall processing load 20, e.g., expressed as a count of the currently-active processing jobs 22. Additionally, "$Vacancy\_Quota_{ij}$" denotes the remaining number of processing jobs 22 that can be allocated to the capacity quota 36 identified by the selected $Dest\_Quota\_Index_{ij}$. In other words, each time a processing job 22 is allocated to a particular capacity quota 36, the count of open slots 44 left within that capacity quota 36 is decremented by one.

Conversely, when any one of the allocated processing jobs 22 terminates (for whatever reason), the slot 44 occupied by the terminating processing job 22 adds to the count of slots 44 available for allocation. Thus, one approach to "housekeeping" for such termination is Vacancy_Quota$_{ij}$+=1, and

PL-=1.

Also, as noted, the trigger for increasing the size of the active set 24 may be detecting that the processing load 20 equals the aggregate allocable jobs capacity 42. This condition thus triggers moving one of the inactive processing units 14 from the inactive set 26 over to the active set 24, and can be expressed as Increase $M$ when PL=AAJC=$M$·AJC=($M$−1)TJC=($M$−1)R.

The above formulation can be understood as comparing the count of current processing jobs 22 constituting the processing load 20 with the count of slots 44 included in the aggregate allocable jobs capacity 42. As noted, some threshold or back-off value can be used to trigger the increase in M in advance of hitting the limit.

Figure 9:
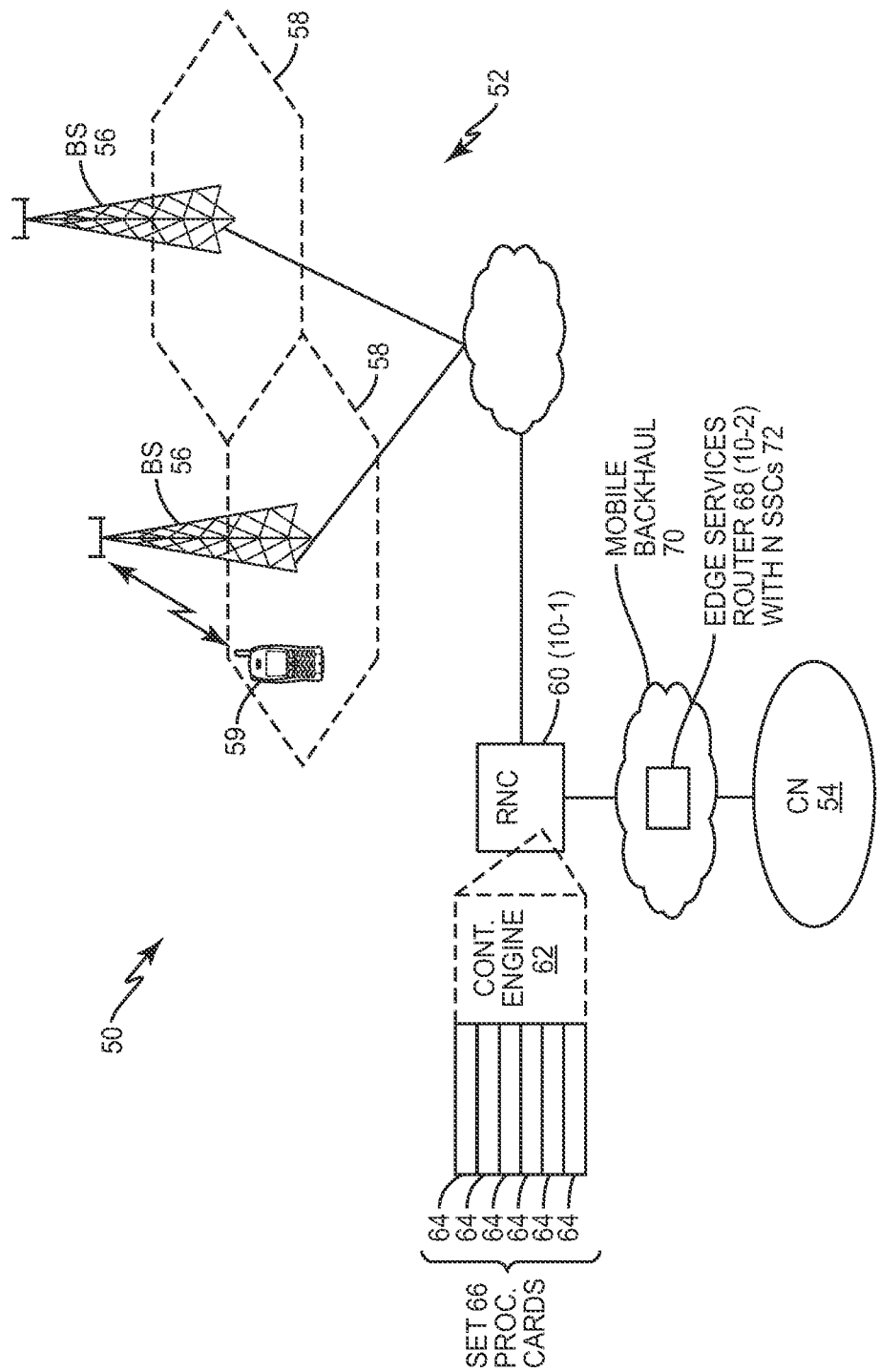
FIG. 9 is a block diagram of one embodiment of a wireless telecommunications network that includes one or more wireless communication apparatuses, e.g., network nodes, that are configured to implement distributed processing system management as taught herein.

Now turning to FIG. 9, one sees the partial illustration of a wireless communication network 50 ("network 50"), which, by way of non-limiting example, may be a Wideband CDMA (WCDMA) network or a Long Term Evolution (LTE) network. The network 50 includes a Radio Access Network (RAN) 52 and a Core Network (CN) 54. While not shown, the CN 54 communicatively links to one or more external networks, such as the PSTN, the Internet, etc.

The RAN 52 includes one or more base stations (BSs) 56, each providing wireless communication service in a corresponding cell 58. Each BS 56 may provide more than one cell 58, and the cells 58 may be overlapping. In any case, it will be appreciated that a given subscriber, depicted as a wireless communication device 59, connects to the network 50 via the RAN 52, and is communicatively coupled to external networks and services through the CN 54.

A Radio Network Controller (RNC) 60 supports such connectivity by linking the BSs 58 in the RAN 52 with the CN 54. Here, the RNC 60 is parenthetically numbered as "10-1" to indicate that it is an example of the earlier described processing apparatus 10. That is, the RNC 60 includes or is otherwise configured as an example of the earlier described processing apparatus 10, and thus the RNC 60 includes one or more distributed processing systems that are managed according to the teachings presented herein.

In one example of such a configuration, the RNC 60 includes a "control engine" 62 which functions as a version of the earlier-described control circuit 18. The control engine 62, which comprises one or more microprocessor-based circuits programmed to perform distributed processing system management, performs such management with respect to a number of processing cards 64, comprising a configured set 66 of such cards. In this regard, it will be understood that the configured set 66 of processing cards 64 represent a specific example of the earlier described configured set 12 of processing units 14—i.e., each installed processing card 64 represents one processing unit 14.

Additionally, or alternatively, the network 50 includes an edge services router 68 as part of the mobile backhaul 70 that includes or is associated with the RNC 60. Here, it should be noted that the RNC 60 may be an "EVO Controller" in an LTE-based implementation, and may not exist in the depicted location or at all in other types of networks. In any case, the edge services router 68 is parenthetically numbered as "10-2" to indicate that it is configured as another example of the earlier described processing apparatus 10, and that it includes processing resources managed as a distributed processing system according to the teachings herein.

As a non-limiting example, the edge services router 68 is an ERICSSON SMARTEDGE Multi-Service Edge Router that delivers carrier-class services such as video, voice, data and interactive content delivery. As part of its functionality, the edge services router 68 consolidates and simplifies the "edge" of the network 50 by converging Ethernet aggregation, Broadband Remote Access Server (B-RAS) and IP/MPLS PE (Internet Protocol/Multiprotocol Label Switching Provider Edge) functionalities onto a single compact platform.

As part of providing these services, the edge services router 68 includes a number of Smart Services Cards (SSCs) 72 that are used for control plane processing of mobile. Each such SSC 72 can be understood in this example as representing one processing unit 14 and as being capable of supporting control-plane processing for some defined maximum number of concurrent subscriber circuits. Thus, in this example, one subscriber circuit equals one processing job 22, and the overall processing load 20 can be expressed as the overall count of active subscriber circuits. It may be assumed that each slot 44 can support one subscriber circuit.

Thus, each active SSC 72 is divided in an equal number of capacity quotas 36, each having R/M slots 44, which means that each capacity quota 36 can be allocated a maximum of R/M subscriber circuits. At least initially, fewer than all N SSCs 72 are activated, meaning that M is initially less than N but is increased as needed to support an overall processing load 20 of concurrent subscriber circuits. At least initially, there would be an active set 24 of M active SSCs 72 and an inactive set of (N−M) inactive SSCs 72.

Following the earlier algorithm for selecting the destination index of a new processing job 22 to be allocated, subscriber circuits will be allocated to the active SSC 72 with the lowest card index first. Indeed, the overall allocation strategy for this example embodiment can be understood as selecting the lowest-indexed SSC 72 that has remaining allocable capacity and selecting the lowest-indexed capacity quota 36 on that SSC 72 that has an open slot 44.

Figure 10:
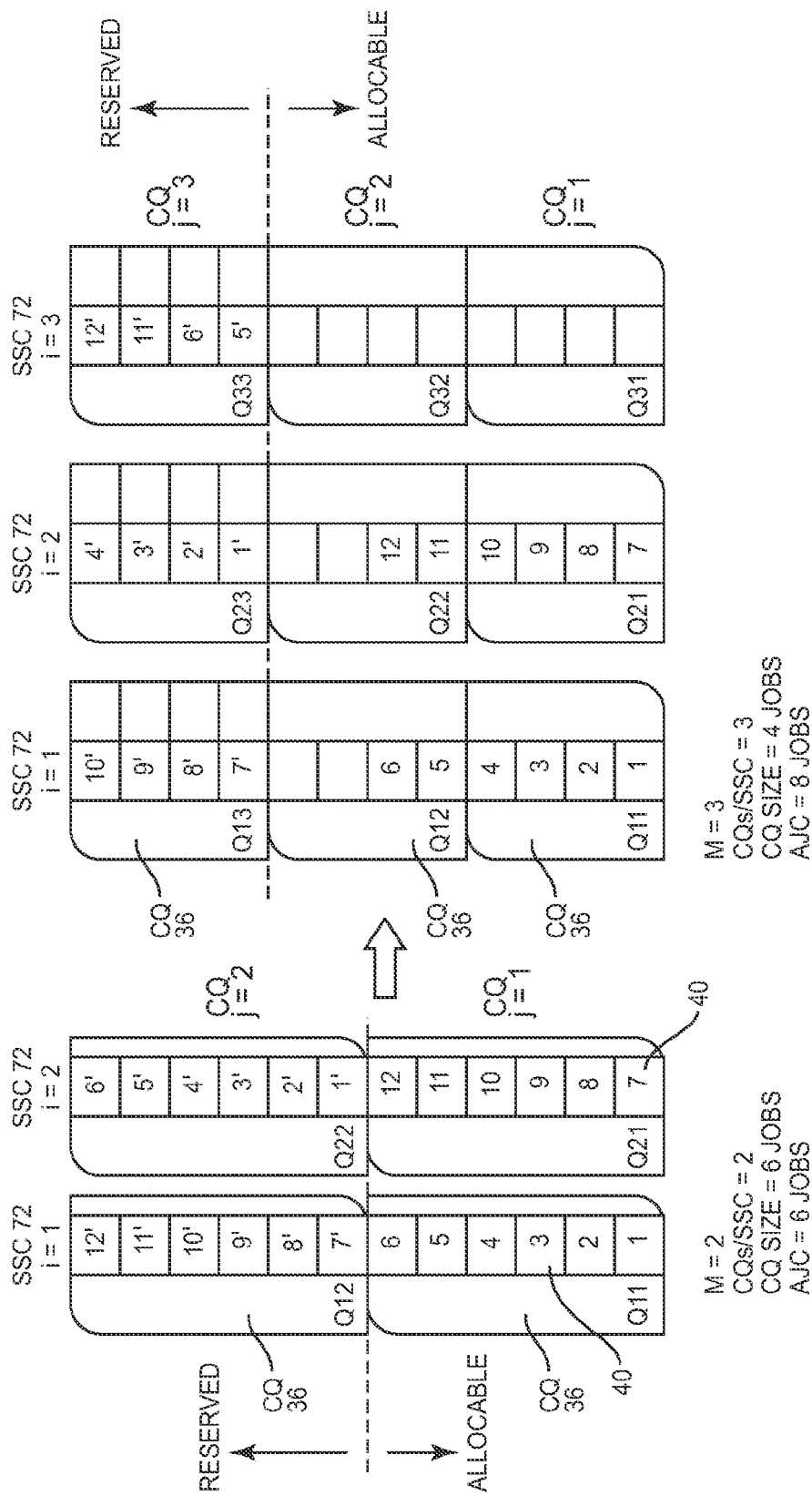
FIG. 10 is a diagram showing the increase in an active set of telecommunication processing cards from two to three, and the corresponding change in capacity quota sizes and slot-to-quota memberships.

FIG. 10 illustrates examples of using this scheme for the case where M is changed from M=2 to M=3. Each SSC 72 has twelve slots 40, meaning that each one supports a maximum of twelve concurrent subscriber circuits. However, for the initial case of M=2, one half of each SSC 72 is reserved, leaving only half of the slots 40 available for normal allocation usage. To emphasize the difference between an unreserved slot 40 and a reserved slot 40, the diagram numbers the first six slots 40 on the first SSC 72 (SSC 1) as 1-6, and numbers the first six slots 40 on the second SSC 72 (SSC 2) as 7-12. Thus, in the absence of failures, the first six subscriber circuits would be allocated in order to slots 1-6 on SSC 1, and the next six subscriber circuits would be allocated to slots 7-12 on SSC 2.

Figure 11:
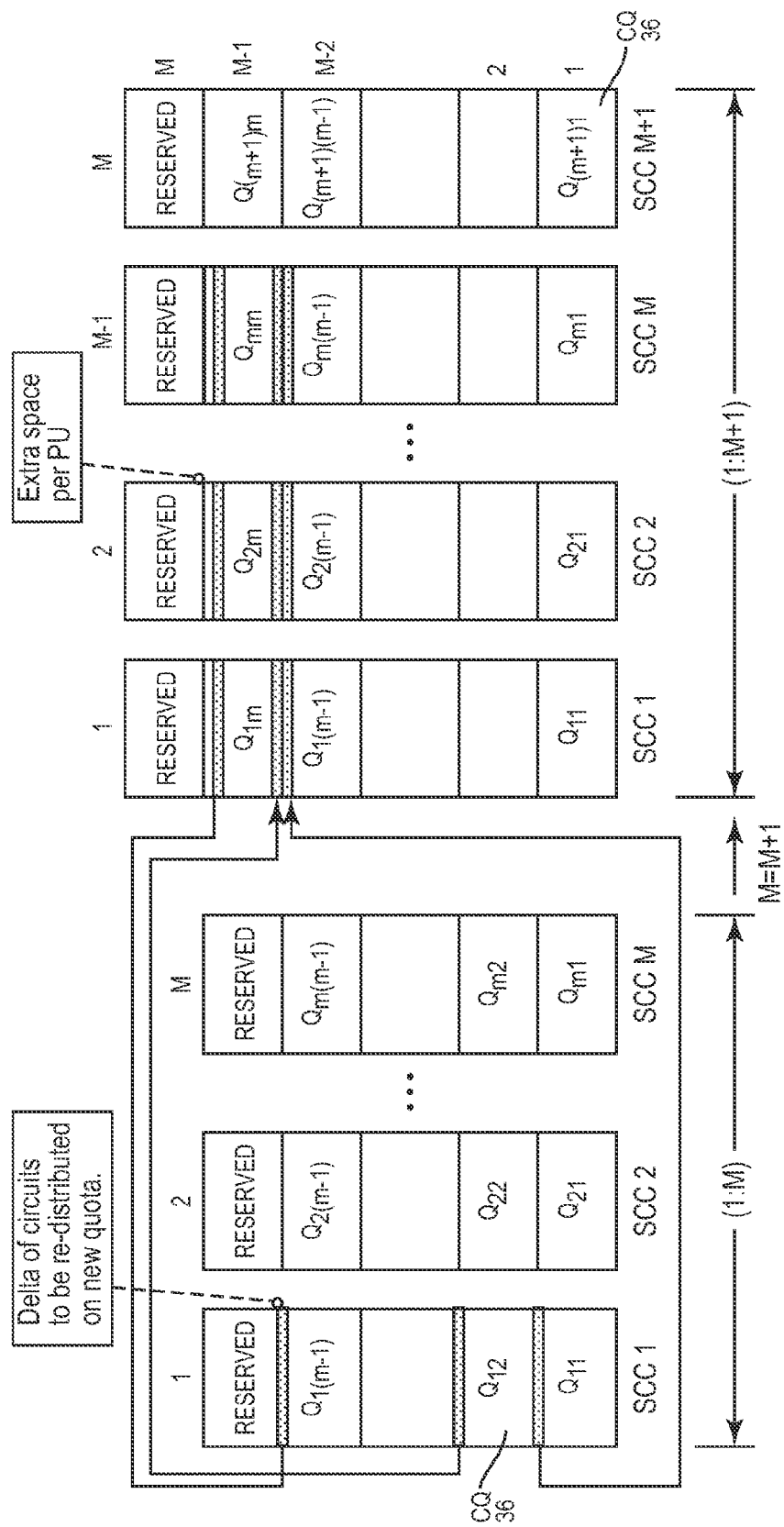
FIG. 11 is a diagram providing further housekeeping details for the generic case where an active set of M processing cards is expanded by incrementing M.

If SSC 2 fails, the subscriber circuits from slots 7-12 would be moved to the reserved slots 7'-12' on SSC 1. Conversely, if SSC 1 fails, the subscriber circuits from slots 1-6 would be moved to the reserved slots 1'-6' on SSC 2. The M=3 portion of FIG. 10 illustrates the same arrangement, but reflects the changed capacity quota sizes and changed slot-to-quota affiliations arising from the shifting in capacity quota boundaries. FIG. 11 illustrates this shifting more clearly for the generic case where M increases to M+1.

For each occupied capacity quota 36 under the original M group, ΔCQ processing resources—e.g., slots or circuits 44 as shown in FIG. 7—will be moved to the new row M, making the initial vacancy value of quota in row M as, $$\text{Vacancy\_Quota}_{lm} = CQ_{M+1} - (M-1) \times \Delta CQ$$
$$= TJC/[M \times (M+1)]$$
$$= \Delta CQ.$$

The newly available capacity quota 36 is equally divided into M slots 40, with each slot 40 free for the allocation of one subscriber circuit. The newly activated SSC 72 initially has no subscriber circuits allocated to it; therefore, all of its capacity quotas 36 have a vacancy value equal to $CQ_{M+1}$. Also, note that "migrating" processing job slots 44 among capacity quotas 36 on the same SSC 72 does not involve real circuit distribution. Instead, the operation constitutes a records keeping exercise in which the data record 19 or other database is updated.

Now consider the case where the active set 24 is shrunk, e.g., contracted from M+1 to M. Such opportunities for contracting the active set 24 arise as the subscriber circuit allocation in the above-described embodiment is prioritized based on SSC index, followed by capacity quota index, and subscriber circuits therefore will cluster in the lowest-indexed capacity quotas 36 on the low-indexed SSCs 72. When the number of subscriber circuits drops (when active subscribers terminate their sessions), the highest-indexed one of the SSCs 72 in the active set 24 will eventually become idle, with no subscriber circuits assigned to it.

While at any given time the active set 24 is generally considered to have M active processing units 14 in it, for clarity in this illustration, the active set 24 is regarded as currently having M+1 active processing units 14 in it, and it will be contracted to M active processing units 14, provided the conditions for contraction are met. In particular, such processing depends on detecting the idle condition for the SSC 72 at the M+1 index (the highest index position in the active set 24 of M+1 processing units 14), which indicates the opportunity to increase operating efficiency by inactivating that highest-indexed, idle SSC 72. In at least one embodiment, the highest-indexed SSC 72 in the active set 24 is moved to the inactive set 26 if: (1) the current processing load 20 (PL) will fit into the aggregate allocable jobs capacity 42 of the active set 24 when changing from (M+1) to (M), i.e., when PL<=AJC×(M)); (2) and if SSC M+1 is idle (i.e., no subscriber circuits are currently allocated to the SSC 72 at the M+1 index position).

Figure 12:
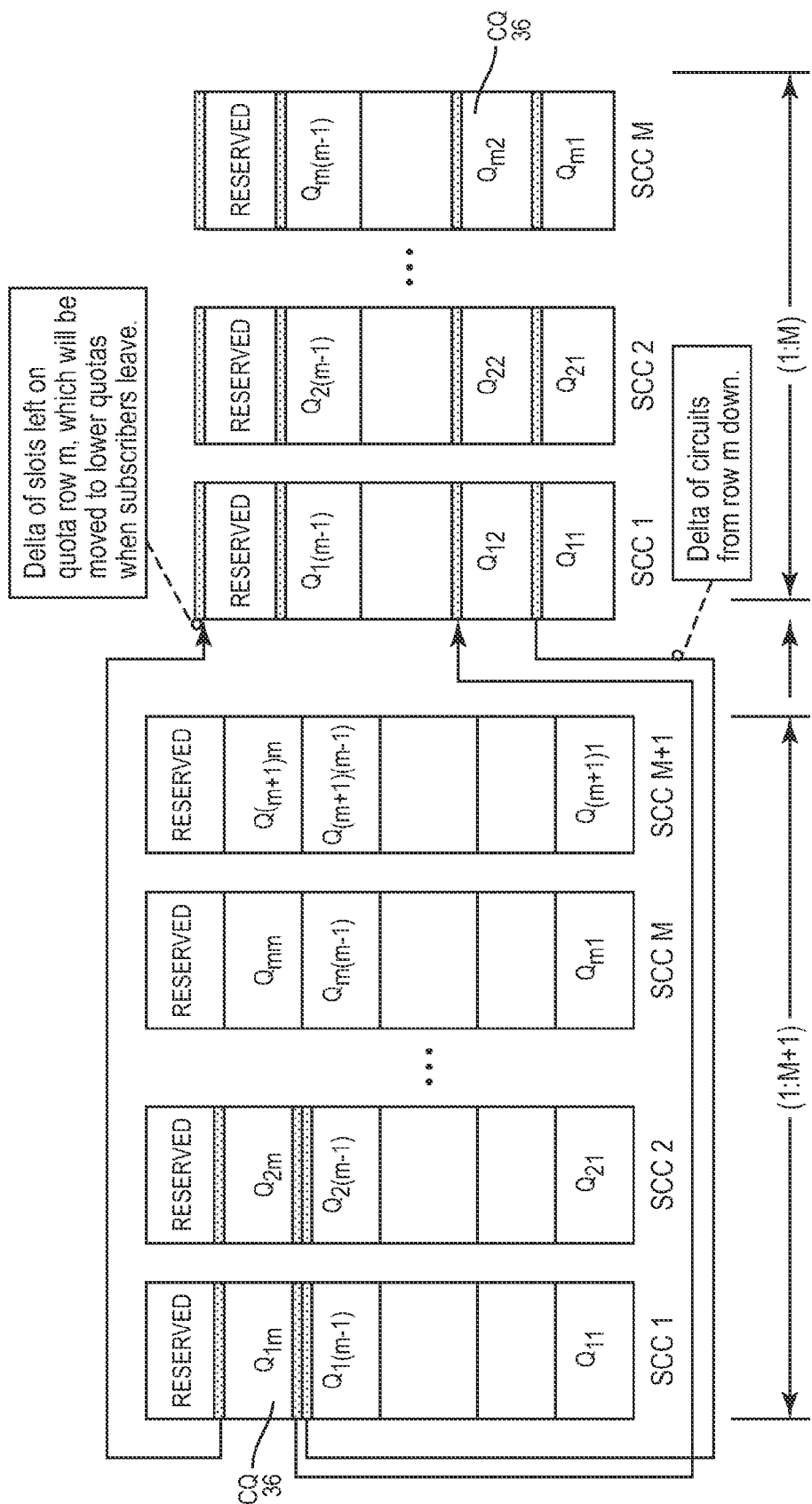
FIG. 12 is a diagram illustrating the converse case, where an active set of M processing cards is contracted by decrementing M.

Shrinking the active set 24 by one changes the capacity quota size, which results in a change in slot-to-quota affiliation on remaining active SSCs 72. See FIG. 12 for an example of such shrinking. To test condition (1) above before reducing the size of the active set 24 from (M+1) to (M), the total filled capacity quota (TFQ) value is given by $$TFQ_{M+1} = AJC \frac{(M-1)}{CQ_{M+1}} = \frac{AJC(M-1)}{\frac{AJC}{M+1}} = M^2 - 1.$$

Therefore, the number of occupied capacity quotas 36 on SSC M is abbreviated as $OCQ_M$ and is expressed as $$OCQ_M = (M^2 - 1) - ((M-1)M) = M - 1.$$

In reality, there may still be sparse population of the highest-indexed capacity quota 36 on SSC M, depending on the pattern of subscribers joining and leaving. The sparseness could be reduced using the same algorithm described below, or the processing logic may simply wait until the highest-indexed capacity quota 36 on SSC M becomes fully vacant.

Since the algorithm will fill the quotas following a lowest-card-index-first criterion, the quotas at row M will be full for SSCs 72 that are indexed i=1 to M. When contracting the active set 24, e.g., decrementing M by one, there will be room to migrate subscriber circuits from row M down to capacity quotas 36 with index j (j<=M−1). After migrating the subscriber circuits to lower quotas (i=1 to M−1), there is still quota surplus ("QS") of $$QS = CQ_{M+1} - (M-1)\Delta CQ$$
$$= AJC \left[ \frac{1}{M+1} - \frac{M-1}{M(M+1)} \right]$$
$$= \frac{AJC}{M(M-1)} \text{ or } \Delta CQ.$$

The subscriber circuits allocated to the slots 40 in the quota surplus will be moved to any of the lower capacity quotas 36, that is, j=1 to M−1 whenever room is freed up in those lower capacity quotas 36. Eventually, $Q_{im}$ will be freed up and the active set 24 settles into the group M configuration. Note that hysteresis can be applied to this decision to prevent rapid expansion and contraction of the active set 24.

In order to preserve the defined level of redundancy, unused slots 40 on one active SSC 72 will be used to create standby subscriber circuits mirroring the active subscriber circuits on another one of the active SSCs 72. For example, standby subscriber circuits are created on a k-th indexed SSC 72 (k not equal to i) for all subscriber circuits currently allocated to $CQ_{ij}$.

Figure 13:
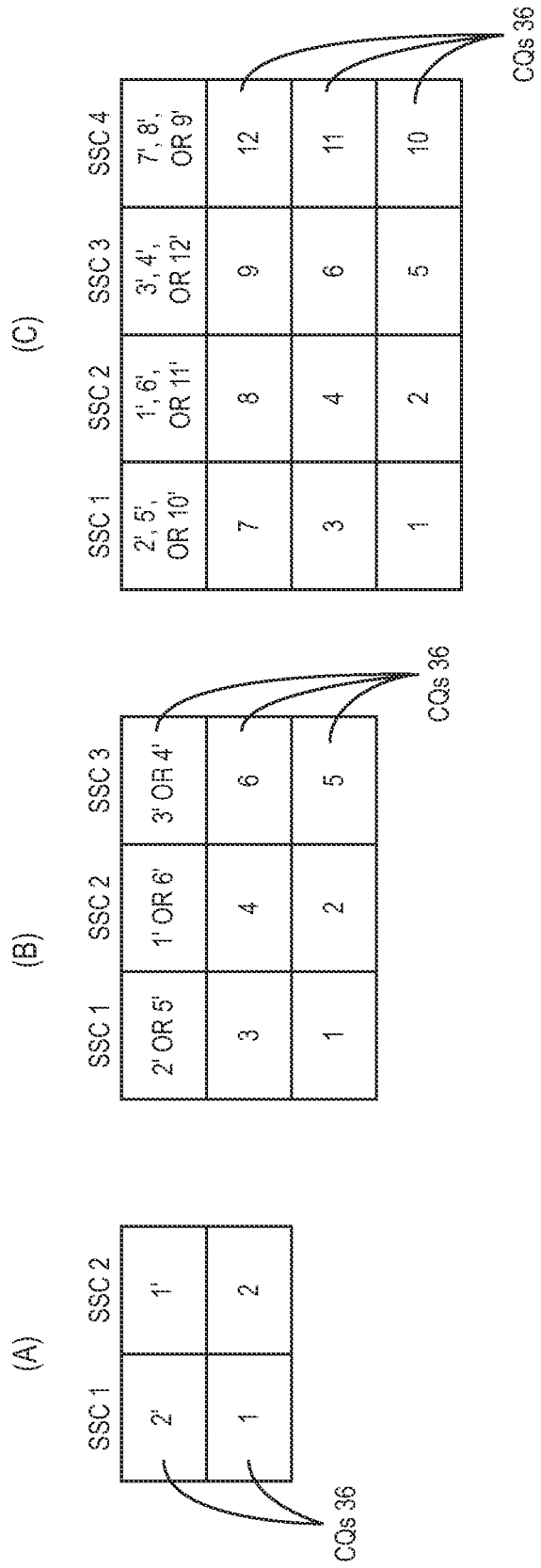
FIG. 13 is a diagram illustrating standby circuit relationships between active capacity quotas and reserved capacity quotas in an active set of processing cards.

The allocation of the redundant capacity quota 36 follows a static, predictable pattern, as can be seen in FIG. 13. In particular, FIG. 13 shows example (a), where M=2, example (b), where M=3, and example (c), where M=4. Using simplified labelling, for example (a) there is a capacity quota "1" on SSC 1 and a capacity quota "2" on SSC 2. Moreover, all subscriber circuits currently allocated to capacity quota 1 on SSC 1 have corresponding standby subscriber circuits in the reserved capacity quota 1' on SSC 2. Likewise, all subscriber circuits currently allocated to capacity quota 2 on SSC 2 have corresponding standby subscriber circuits in the reserved capacity quota 2' on SSC 1.

The same approach is seen for examples (b) and (c). However, to understand those examples, it should be appreciated that the standby subscriber circuits created in a reserved capacity quota 36 on any particular active SSC 72 is a function of which other active SSC 72 fails. Thus, the reserved capacity quota 36 on SSC 1 in example (b) functions as a reserved capacity quota 2' for creating standby circuits for capacity quota 2 on SSC 2 or as a reserved capacity quota 5' for creating standby circuits for capacity quota 5 on SSC 3. Similar circumstances are seen for example (c) as well. Compared with conventional, randomized circuit allocation algorithms, the illustrated approach to standby circuit location can be done statically, without any required hashing. This further simplifies the allocation/re-allocation of jobs.

When one of the active SSCs 72 in the active set 24 fails, an event will be distributed to all other SCCs 72, which triggers the corresponding reserved capacity quotas 36 to go active.

When the failed SSC 72 is restored, the affected subscriber circuits will be re-distributed back to it in a revertive fashion. Thus, active/standby notation stays in the quota level, without the need to traverse every subscriber circuit.

Likewise, adding a new SCC 72 to the active set 24 is straightforward, following the same mechanism as stated in the above-explained expansion algorithm section. Notably, there is no redistribution of subscriber circuits across active SSCs 72. Removing an SSC 72 ("SSC X") from the active set 24 is also a simple process, and can follow this example logic:
- the standby subscriber circuits from SSC X and SSC N are deleted;
- the capacity quota numbers between SSC X and SSC N are swapped—that is, SSC N replaces SSC X; and;
- place necessary standby circuit information to the newly designated SSC X.
- Once the above sequence is complete, the old SSC X could be removed after all its subscriber circuits have been terminated or a timeout is reached.

The reason for the swap described above is to re-balance the SSC location. Implicitly, only the SSC 72 with the largest card index is removed. It should also be noted here that no active subscriber circuits are re-distributed, but rather only the standby subscriber circuits. One additional advantage of this scheme is that if a user (authorized maintenance person) decides to remove an SSC 72 where the targeted SSC 72 is already idle, there is zero service disruption SSC N, on the other hand, will always have a minimal amount of allocated subscriber circuits, as subscriber circuits are assigned based on the lowest card index first.

With the above example in mind, it will be appreciated that processing apparatus 10 in one or more embodiments comprises a telecommunications processing apparatus, e.g., 60 or 68, that is configured for operation in a telecommunications network, e.g., the network 50. In such a configuration, the configured set 12 of processing units 14 comprises an installed set of processing cards, e.g., 64 or 72. Here, the total jobs capacity 30 of each processing card comprises a total circuit capacity and each constituent circuit supports a defined telecommunications processing task or a related set of tasks broadly referred to as one processing job 22. For example, each such circuit supports one telecommunications subscriber at any given time—e.g., each slot 44 as shown in FIG. 7 provides signal processing and/or communications control services for a given subscriber call, connection, session, or other set of related or joint processing tasks.

Figure 14:
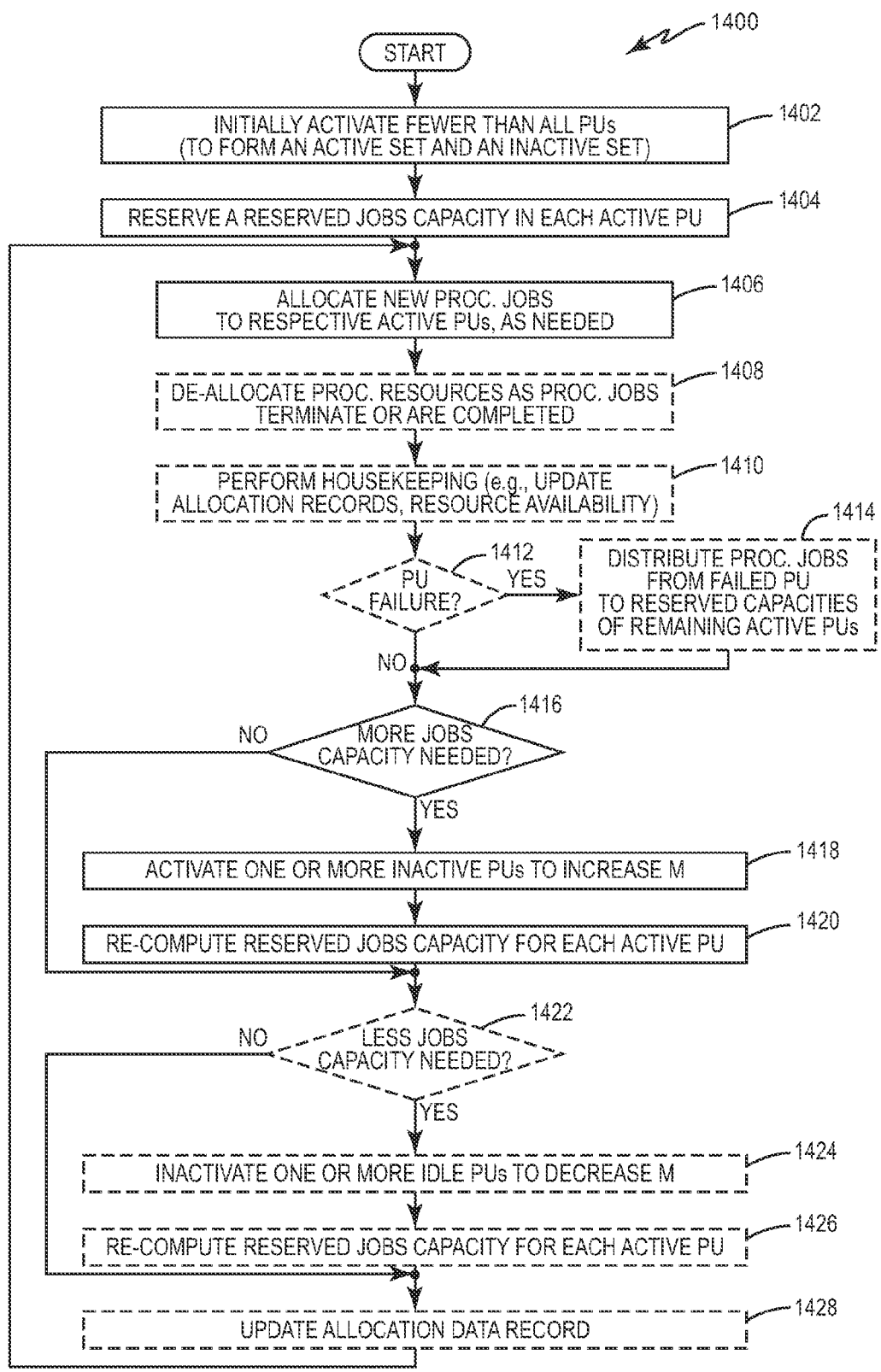
FIG. 14 is a logic flow diagram of one embodiment of a load allocation method taught herein.

However, whether implemented in the context of a telecommunications network node or in another context, it will be understood that the teachings herein provide an advantageous method of managing processing resources in a distributed processing system. FIG. 14 illustrates an example of such processing, depicted as method 1400.

The method 1400 is implemented, for example, at least in part based on the control circuit 18 of the apparatus 10 executing computer program instructions stored in a memory or other computer-readable medium that is in or accessible to the control circuit 18. However, it will be recognized that fixed, non-programmable circuitry also may be used to implement at least a portion of the control and processing logic embodied in the method 1400. Further, it will be appreciated that certain operations illustrated for the method 1400 may be performed in an order differing from the illustration, or in parallel, or as part of some larger set of operations. Finally, it will be appreciated that some operations illustrated in FIG. 14 are optional or ancillary; such operations are shown in dashed boxes. The method 1400 in at least one embodiment omits all operations illustrated in the dashed boxes, while other embodiments includes a subset of the optional or ancillary operations, and still others include all illustrated operations.

With these qualifications in mind, in a base embodiment, the method 1400 concentrates a processing load 20 comprising individually allocable processing jobs 22 to the minimum number of processing units 14 in a configured set 12 of processing units 14 needed to maintain a defined level of processing redundancy for the processing jobs 22. As described before, the absolute number of processing units 14 needed to support the processing load 20 with the defined level of processing redundancy is that number M which (a) provides processing resources sufficient for allocation of the processing load 20, while (b) simultaneously preserving in the active set 24 of processing units 14 an aggregate reserved jobs capacity 40 sufficient to "absorb" the allocable jobs capacity 34 from any one active processing unit 14. As shown before, setting aside a reserved jobs capacity 32 of TJC/M in each active processing unit 14 accomplishes this goal.

Thus, in operation, the method 1400 includes initially activating fewer than all of the configured set 12 of processing units 14, thereby logically forming an active set 24 of two or (active) more processing units 14 to which new processing jobs 22 are allocable, and a remaining, inactive set 26 of one or more (inactive) processing units 14 to which new processing jobs 22 are not allocable (Block 1402). The method 1400 further includes reserving in each active processing unit 14 a reserved jobs capacity 32 equal to the total jobs capacity 30 of one processing unit 14 divided by the number M of active processing units 14 (Block 1404).

This reservation operation leaves in each active processing unit 14 a remaining allocable jobs capacity 34 and preserves, as the defined level of processing redundancy, an aggregate reserved jobs capacity 40 across the active processing units 14 that is equal to the total jobs capacity 30 of one processing unit 14. Using the earlier nomenclature for brevity, the processing circuits 28 (or processing resources more generally) of each active processing unit 14 are divided into two portions: a reserved portion—the RJC—left open during normal operations for receiving processing jobs re-allocated from any one active processing unit 14 in the active set 24 that fails; and an allocable portion—the AJC—that is available for the allocation of new processing jobs 22 as they arise during normal operations. The division between reserved and allocable portions changes dynamically as M increases or decreases in value.

In this regard, the method 1400 further includes allocating new processing jobs 22 to respective ones of the active processing units 14 until more jobs capacity (in the active set 24) is needed to preserve the defined level of processing redundancy (Block 1406). Note that in conjunction with such operations, the method 1400 also may include the ongoing de-allocation of processing resources from affected ones of the active processing units 14, as processing jobs 22 are completed or otherwise terminated (Block 1408), and may also include various "housekeeping" operations, such updating allocation records, monitoring remaining allocable jobs capacity in the active set 24, etc. (Block 1410).

Still further, while not essential to the basic operations that concentrate processing jobs 22 in the minimum number of processing units 14, the method 1400 in one or more embodiments includes the illustrated failure processing, wherein the failure of any one processing unit 14 in the active set 24 is detected (Block 1412) and its allocated processing jobs 22 are redistributed from the failed processing unit 14 to the reserved jobs capacities 32 of the remaining active processing units 14 (Block 1416). Note that failure-mode processing generally also includes activating an inactive processing unit 14, to regain the desired level of processing redundancy for the active set 24.

Regardless of these details, processing continues with determining whether more jobs capacity is needed (Block 1416). This should be understood as part of normal, ongoing operations, wherein the processing apparatus 10 monitors or otherwise tracks how "full" the allocable jobs capacity 34 is for each active processing unit 14 and/or monitors the aggregate remaining allocable jobs capacity across the active set 24 of active processing units 14. In at least one embodiment, a minimum threshold or back-off value is defined, so that the process of activating an inactive processing unit 14 is triggered when the aggregate remaining allocable jobs capacity falls to, say, ten percent of its maximum or starting value. Other triggering procedures are contemplated, such as adding capacity if the processing load 20 is above a given percentage of the maximum value of the aggregate allocable jobs capacity of the active set 24 and is trending higher at or above a given rate of increase.

However the decision is made, if more capacity is needed (YES from Block 916), processing continues with activating one or more of the inactive processing units 14 from the inactive set 26 (Block 1418) to increase M and correspondingly re-computing the reserved jobs capacity 32 of each active processing unit 14, to reflect the increase in M (Block 1420). The method 1400 also may include checking whether the active set 24 has excess capacity (Block 1422) and, if so (YES from Block 922), inactivating one or more of the idle processing units 14 that are in the active set 24 (Block 1424) and correspondingly re-computing the reserved jobs capacity 32 of each active processing unit 14 to reflect the decrease in M (Block 1426).

Still further, the method 1400 may include additional housekeeping, such as updating the data record 19 (shown in FIG. 1) to reflect changes in the allocation details (Block 1428)—e.g., changes in the mapping of processing jobs 22 to particular processing units 14 and/or to particular capacity quotas 36 on particular processing units 14. From there, processing "returns" to the new jobs allocation operations (Block 1406). Of course, there may be other loops not illustrated, and some operations may involve parallel loops, concurrent execution, etc. In at least one embodiment, the processing apparatus 10 allocates new processing jobs 22 as they arise, de-allocates processing resources as previously allocated processing jobs 22 complete, terminate, or otherwise expire, and dynamically grows or shrinks the active set 24, as needed to maintain the defined level of processing redundancy while still minimizing the number, all in response to a dynamically changing processing load 20.

Of course, modifications and other embodiments of the disclosed invention(s) will come to mind to one skilled in the art having the benefit of the teachings presented in the foregoing descriptions and the associated drawings. Broadly, in the present invention, a dynamic load distribution scheme is used to maximize power efficiency of a configured set of processing units, such as a card protection group in a telecommunication node. The number of active cards in the card protection group is monitored and adjusted from two cards up to the maximum number of cards configured in the group, based on the changing processing load. The disclosed techniques also can provide backup circuits required in a hot redundancy scheme. Further, cards not in active use can be placed into a low-power mode to reduce power consumption.

Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of concentrating a processing load comprising individually allocating processing jobs to a minimum number of processing units in a configured set of processing units to maintain a defined level of processing redundancy for the processing jobs, said method comprising:

initially activating fewer than all of the processing units in the configured set, thereby logically forming an active set of two or more processing units to which new processing jobs are allocable and an inactive set of one or more processing units to which new processing jobs are not allocable, wherein those processing units currently in the active set are referred to as active processing units and those processing units currently in the inactive set are referred to as inactive processing units;

logically dividing the total jobs capacity of each of the active processing units into M capacity quotas, wherein M is the number of active processing units, wherein said total lobs capacity is same for all processing units in the configured set;

reserving in each of the active processing units a reserved jobs capacity equal to one capacity quota, thereby leaving the remaining one or more capacity quotas in each of the active processing units as allocable jobs capacity and preserving, as said defined level of processing redundancy, an aggregate reserved jobs capacity across the active processing units that is equal to the total jobs capacity of one processing unit; and allocating new processing jobs to respective ones of the active processing units until more allocable jobs capacity is needed to preserve the defined level of processing redundancy, and then activating one or more of the inactive processing units to increase M, and correspondingly re-computing the reserved jobs capacity that is reserved in each of the active processing units to reflect the increase in M, so that the minimum number of processing units are active to maintain the aggregate reserved jobs capacity across the active processing units as equal to the total jobs capacity of one processing unit.

2. The method of claim 1, further comprising, based at least in part on detecting that one of the active processing units is idle, wherein it has no processing jobs allocated to it, inactivating the idle processing unit, thereby moving the idle processing unit to the inactive set and decreasing M, and correspondingly re-computing the reserved jobs capacity that is reserved in each active processing unit to reflect the decrease in M.

3. The method of claim 2, further comprising conditioning the decision to move the idle processing unit to the inactive set on at least one of: the idle processing unit being idle for a defined minimum idle time; and an activity measure representing a rate at which new processing jobs are arising.

4. The method of claim 1, further comprising, at least for said initial activation, activating the processing units according to an activation preference scheme in which a more preferred one of the processing units is activated before a less preferred one of the processing units.

5. The method of claim 1, wherein at least some of the processing units in the configured set of processing units have differing processing efficiencies, and further comprising, at least for said initial activation, preferentially activating more efficient ones of the processing units.

6. The method of claim 1, wherein the processing units in the configured set are logically indexed, and further comprising preferentially allocating new processing jobs as they arise to lower-index ones of the active processing units, so that higher-index ones of the active processing units are more likely to become idle and, based at least in part on detecting that one of the active processing units has become idle, moving the idle processing unit from the active set to the inactive set, thereby decreasing M, and correspondingly re-computing the reserved jobs capacity that is reserved in each active processing unit to reflect the decrease in M.

7. The method of claim 1, wherein the method further comprises maintaining the inactive processing units in a reduced-power condition.

8. The method of claim 1, wherein each capacity quota can support an equal integer number of concurrent processing jobs.

9. The method of claim 8, wherein said allocating new processing jobs to respective ones of the active processing units comprises mapping each new processing job to a selected one of the capacity quotas on a selected one of the active processing units, and wherein the method further comprises maintaining a data record reflecting the one-to-one mapping between each currently-active processing job and the respective capacity quota to which that processing job is assigned.

10. The method of claim 9, further comprising resizing the capacity quotas dynamically as the number M of active processing units is increased or decreased to reflect changes in the processing load, and correspondingly updating the data record to reflect any changes in the one-to-one mapping of processing jobs to capacity quotas arising from the resizing of the capacity quotas.

11. The method of claim 10, further comprising filling the capacity quotas that are within the allocable jobs capacity on any one of the active processing units according to a quota filling scheme that attempts to fully utilize each given capacity quota before allocating any processing jobs to a next one of the capacity quotas.

12. The method of claim 1, wherein the method is implemented in a telecommunications processing apparatus and the configured set of processing units comprises an installed set of processing cards, and wherein the total jobs capacity of each processing card comprises a total circuit capacity and each circuit supports one telecommunications subscriber at any given time.

13. A processing apparatus comprising:
a configured set of processing units;
an interface circuitry for interfacing with said configured set of processing units; and
a control circuit that is configured to concentrate a processing load comprising individually allocating processing jobs to a minimum number of said processing units to maintain a defined level of processing redundancy for the processing jobs, based on said control circuit being configured to:
  initially activate fewer than all of the processing units in the configured set, thereby logically forming an active set of two or more processing units to which new processing jobs are allocable and an inactive set of one or more processing units to which new processing jobs are not allocable, wherein those processing units currently in the active set are referred to as active processing units and those processing units currently in the inactive set are referred to as inactive processing units;
  logically divide the total lobs capacity of each active processing unit into M capacity quotas, wherein M is the number of active processing units, wherein said total lobs capacity is same for all processing units in the configured set;
  reserve in each of the active processing units a reserved jobs capacity equal to one capacity quota, thereby leaving the remaining one or more capacity quotas in each of the active processing units as allocable jobs capacity and preserving, as said defined level of processing redundancy, an aggregate reserved jobs capacity across the active processing units that is equal to the total jobs capacity of one processing unit; and
  allocate new processing jobs to respective ones of the active processing units until more allocable jobs capacity is needed to preserve the defined level of processing redundancy, and then activate one or more of the inactive processing units to increase M, and correspondingly re-compute the reserved jobs capacity that is reserved in each of the active processing units to reflect the increase in M, so that the minimum number of processing units are active to maintain the aggregate reserved jobs capacity across the active processing units as equal to the total jobs capacity of one processing unit.

14. The processing apparatus of claim 13, wherein the control circuit is configured to detect that any one of the active processing units is idle, wherein it has no processing jobs allocated to it, inactivate the idle processing unit, thereby moving the idle processing unit to the inactive set and decreasing M, and is further configured to correspondingly re-compute the reserved jobs capacity that is reserved in each active processing unit to reflect the decrease in M.

15. The processing apparatus of claim 14, wherein the control circuit is configured to condition the decision to move the idle processing unit to the inactive set on at least one of: the idle processing unit being idle for a defined minimum idle time; and an activity measure representing a rate at which new jobs are arising.

16. The processing apparatus of claim 13, wherein the control circuit is configured to, at least for said initial activation, activate the processing units according to an activation preference scheme in which more a more preferred one of the processing units is activated before a less preferred one of the processing units.

17. The processing apparatus of claim 13, wherein at least some of the processing units in the configured set of processing units have differing processing efficiencies, and wherein the control circuit is configured to, at least for said initial activation, preferentially activate more efficient ones of the processing units.

18. The processing apparatus of claim 13, wherein the processing units in the configured set are logically indexed, and wherein the control circuit is configured to preferentially allocate new processing jobs as they arise to lower-index ones of the active processing units, so that higher-index ones of the active processing units are more likely to become idle and, wherein the control circuit is further configured to detect that any one of the active processing units has become idle and, based at least in part on detecting the idle processing unit, move the idle processing unit from the active set to the inactive set, thereby decreasing M, and is further configured to correspondingly re-compute the reserved jobs capacity that is reserved in each active processing unit to reflect the decrease in M.

19. The processing apparatus of claim 13, wherein the control circuit is configured to maintain the inactive processing units in a reduced-power condition.

20. The processing apparatus of claim 13, wherein each capacity quota can support an equal integer number of concurrent processing jobs.

21. The processing apparatus of claim 20, wherein said control circuit is configured to allocate new processing jobs to respective ones of the active processing unit based on being configured to map each new processing job to a selected one of the capacity quotas on a selected one of the active processing units, and to maintain a data record reflecting the one-to-one mapping between each currently-active processing job and the respective capacity quota to which that processing job is assigned.

22. The processing apparatus of claim 21, wherein the control circuit is configured to resize the capacity quotas dynamically as the number M of active processing units is increased or decreased responsive to changes in the processing load, and correspondingly update the data record to reflect any changes in the one-to-one mapping of processing jobs to capacity quotas arising from the resizing of the capacity quotas.

23. The processing apparatus of claim 22, wherein the control circuit is configured to fill the capacity quotas that are within the allocable jobs capacity on any one of the active processing units according to a quota filling scheme that attempts to fully utilize each given capacity quota before allocating any processing jobs to a next one of the capacity quotas.

24. The processing apparatus of claim 23, wherein the processing apparatus comprises a telecommunications processing apparatus configured for operation in a telecommunications network, and wherein the configured set of processing units comprises an installed set of processing cards, and wherein the total jobs capacity of each processing card comprises a total circuit capacity and each circuit supports one telecommunications subscriber at any given time.

* * * * *